(12) United States Patent
Lin et al.

(10) Patent No.: US 6,633,412 B1
(45) Date of Patent: Oct. 14, 2003

(54) SMOOTHNESS ENHANCEMENT IN LASER PRINTING THROUGH PERIODIC MODULATION OF HALFTONE CELL

(75) Inventors: Tsung-Nan Lin, San Jose, CA (US); Joseph Shu, San Jose, CA (US)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/277,864

(22) Filed: Mar. 26, 1999

(51) Int. Cl.[7] .................. G06F 15/00; G06K 15/00; H04N 1/46
(52) U.S. Cl. .................. 358/3.13; 358/3.14; 358/3.19; 358/3.26; 358/533; 358/534; 358/535; 358/536; 358/1.9
(58) Field of Search .................. 358/1.9, 298, 455, 358/456, 457, 458, 3.13, 3.14, 3.19, 3.26, 533–536; 382/270, 271, 272, 273

(56) References Cited

U.S. PATENT DOCUMENTS

| 4,032,978 | A |   | 6/1977  | Wong |
| 4,868,684 | A | * | 9/1989  | Suzuki .................. 358/3.15 |
| 4,926,248 | A |   | 5/1990  | Kobayashi et al. |
| 4,980,757 | A | * | 12/1990 | Nishigaki .................. 358/533 |
| 5,166,809 | A | * | 11/1992 | Surbrook .................. 101/211 |
| 5,432,611 | A | * | 7/1995  | Haneda et al. ............. 358/3.02 |
| 5,555,102 | A | * | 9/1996  | Dalton .................. 358/3.14 |
| 5,583,660 | A |   | 12/1996 | Rylander |
| 5,633,729 | A |   | 5/1997  | Smith et al. |
| 5,748,328 | A |   | 5/1998  | Usami et al. |
| 5,764,862 | A |   | 6/1998  | Metcalfe et al. |
| 5,768,411 | A |   | 6/1998  | Shu et al. |
| 5,796,929 | A |   | 8/1998  | Shu et al. |
| 5,875,287 | A |   | 2/1999  | Li et al. |

* cited by examiner

Primary Examiner—Edward Coles
Assistant Examiner—Monica Mitchell
(74) Attorney, Agent, or Firm—Mark P. Watson

(57) ABSTRACT

When clustered-dot dithering is employed in laser printers a banding effect sometimes results from the interaction of the dither matrix with non-uniform line spacing in the printer. We have found that we can lessen the effect of this interaction if we change the dither matrix as it moves over the image. We do this by modulating the dither matrix (halftone cell) as a function of the spatial position of the sub-area in the image. Halftone cells can be formed in a variety of patterns (e.g. vertical, horizontal, etc.) but generally their threshold values grow from a minimum value to a maximum value. Our process is to modulate the halftone cell according to a function: f (s, h) where s is the spatial position of the sub-area of the image and h is the halftone cell. We modulate the cell by altering the relative positions of the threshold values in the cell as we move the cell over the image. This effectively breaks up the bands of clusters of one size or another and provides a visually uniform image even in lighter tones.

15 Claims, 9 Drawing Sheets

|  |  |  |  |  |  |  |  |
|---|---|---|---|---|---|---|---|
| 207 | 215 | 191 | 143 | 49 | 41 | 65 | 113 |
| 223 | 255 | 247 | 183 | 33 | 1 | 9 | 73 |
| 199 | 239 | 231 | 167 | 57 | 17 | 25 | 89 |
| 135 | 175 | 159 | 151 | 121 | 81 | 97 | 105 |
| 53 | 45 | 69 | 117 | 201 | 209 | 185 | 137 |
| 37 | 1 | 13 | 77 | 217 | 255 | 241 | 177 |
| 61 | 21 | 29 | 93 | 193 | 233 | 225 | 161 |
| 125 | 85 | 101 | 109 | 129 | 169 | 153 | 145 |

| h | h | h | ... | h |
|---|---|---|---|---|
| h | | | | |
| h | | | | |
| ⋮ | | | | |
| h | | | | |

| $h_{11}$ | $h_{12}$ | $h_{13}$ | ... | $h_{1j}$ |
|---|---|---|---|---|
| $h_{21}$ | | | | |
| $h_{31}$ | | | | |
| ⋮ | | | | |
| $h_{i1}$ | | | | $h_{ij}$ |

SMOOTHNESS ENHANCEMENT IN LASER PRINTING THROUGH PERIODIC MODULATION OF HALFTONE CELL

CROSS REFERENCE

Cross reference is made to related applications of Joseph Shu and Chia-Hsin Li: U.S. Ser. No. 741,426, filed Oct. 24, 1996, entitled "Banding and Ink-Bleeding Reduction in Cluster Dither by Screen Displacement", now U.S. Pat. No. 5,796,929, U.S. Ser. No. 607,075, filed Feb. 26, 1996, entitled "Dispersed-Dot Dither With Improved Light-Color Smoothness", now U.S. Pat. No. 5,768,411, and U.S. Ser. No. 607,071, filed Feb. 26, 1996, entitled "Banding Noise Reduction for Clustered-Dot Dither", now U.S. Pat. No. 5,875,287.

BACKGROUND OF THE INVENTION

1. Field of the Invention

This invention relates generally to digital image processing and more particularly to systems for rendering high quality images through halftoning.

2. Background of the Invention

Color digital images are multidimensional. An image is sampled in two-dimensions and the smallest unit in the two-dimensional plane that can be individually recognized, stored or processed is called a picture element (pixel or pel). Each pixel will have a certain size (height and width) in the two-dimensional plane but will also be characterized in a third dimension that represents its tone intensity. This will be a quantized value or values. For example, a color image may be represented by three quantized values per pixel, one value each for red, green and blue. The image texture will be affected, in part, by the number of quantization levels. For example, 256 quantization levels (ranging from 0 to 255) can be represented with 8 bits/color. Another factor that affects image texture is the sampling resolution and in order to achieve good quality at low quantization levels high resolution is required.

Although a color image may be scanned and stored, or computer generated, with a relatively large number of quantization levels, image rendering devices such as color printers are capable of producing far less quantization levels, typically two-print a dot at a pixel location or not print a dot at a pixel location.

In order to render the original or source, high quantization (e.g. 8 bits/color/pixel precision) image with an output, low quantization (e.g. 1 bit/color/pixel precision) device, the high quantization image must be converted into a bilevel image pattern that the human visual system will tend to integrate over areas into the higher quantization level source image. This is possible because of the limited visual ability to discriminate between small differences in tonal ranges at a normal viewing distance. This rendering process is referred to as halftoning. Generally speaking, the source image is divided into small sub-areas each with a number of pixels. The pixels in the sub-area are printed or not printed so that when the sub-area is viewed at a distance it simulates a gray or color sensation.

A widely employed approach to performing digital halftoning is referred to as ordered-dither halftoning. In this process a halftone cell is first established. This halftone cell is a matrix or array of threshold values. A great deal of research goes into establishing the threshold pattern of the cell so that it ensures a smooth transition of tone across the tonal range. The halftone cell is conceptually overlaid on a sub-area of the source image and each threshold value in the array is compared with an associated pixel value in the source image. The halftone cell is moved over each sub-area until it tiles the entire source image. The culmination of these threshold value/pixel value comparisons is a bilevel image that simulates the original source image.

A variety of dither-array pattern types have been proposed and used, each of which has its own advantages and disadvantages. The type commonly referred to as "clustered-dot" dithering employs a dither matrix in which higher values tend to be clustered near other higher values, and lower values tend to be clustered near other lower values. A uniform gray level is rendered in the binary image as clusters of printed pixels, the cluster size depending on the underlying gray value. The resultant image is visually similar to those produced by the traditional half-tone photoengraving screen. An advantage of clustered-dot dithering is that it compensates for the inability of certain display devices to display isolated pixels.

For example, in laser printers, typically, the laser beam scans from left to right and/or right to left in successive rows as it prints on the page. In this way, it renders an image in a raster-scan format as discrete picture-element (pixel) values. This representation, as well as processing employed to command the printer to render the image, are based on the assumption of a regular pixel spacing: the row-to-row spacing is assumed to be uniform. In reality, however, even slight misregistrations can cause artifacts in the printed image.

One of the undesirable visual artifacts of this misregistration or lack of uniformity in pixel spacing is a type of banding that is sometimes seen in regions where the display device is attempting to render a uniform gray or other color level, especially in the light tones. Instead of the uniform color, the non-uniform scan-line spacing ends up causing bands of lighter and darker regions. This typically results from interaction of the non-uniform line spacing with the half-toning process that the printer uses to render shades of gray.

At any given pixel, devices such as laser printers are typically capable only of on-and off operation: they either form a dot in the pixel or not. In order to render gray-scale values, printers rely instead on duty cycle. In regions that are intended to be darker, more pixels receive dots. In lighter regions, fewer do. One way of achieving this result is to have groups of dots form clusters, which are larger or smaller in accordance with the intended gray level to be rendered. Non-uniform spacing can make clusters formed by different row sequences differ in size and thereby cause unintended variations in displayed color. These variations tend to form undesirable visible bands.

One can attempt to avoid this effect by employing different half-toning techniques, such as distributed-dot dithering, in which the "turned-on" pixels are not clustered together. Because clusters generally do not form, non-uniform scan-line spacing does not change cluster size, so the non-uniform line spacing is less evident. However this method is not well suited to laser printers that are limited in their ability to print isolated pixels.

OBJECTS OF THE INVENTION

Therefore, it is an object of the present invention to overcome the aforementioned problems.

A further object of the invention is to provide a halftoning system that is ideally suited for use in display devices with limited capability in displaying isolated pixels.

Another object of the invention is to minimize the banding effect even when using clustered-dot dithering.

SUMMARY OF THE INVENTION

Typically in laser printers a dither matrix is employed for cluster-dot dithering. The dither matrix is tiled over the entire input image. It is moved over one sub-area and each threshold value of the dither matrix is compared to the tone intensity or value of the corresponding pixel in the image sub-area. The result is clusters of dots in the sub-area of the resultant image, the number and/or size of the dot clusters will depend on the tone intensity of the sub-area. In prior methods, the same dither matrix is then moved over the next sub-area and again the same threshold values in the same relative locations in the dither matrix are compared with the corresponding pixel values of this next-sub-area. As this process is repeated throughout the image, clusters formed by different row sequences may differ in size even in areas of the image that have a uniform tone intensity. In light tone areas especially, these clusters of one size in one row and clusters of a second size in a different row show up as bands. As mentioned previously, this banding effect is generally caused by the interaction of non-uniform line-spacing with the dither matrix.

We have found that we can lessen the effect of this interaction if we change the dither matrix as it moves over the image. We do this by modulating the dither matrix (halftone cell) as a function of the spatial position of the sub-area in the image. Halftone cells can be formed in a variety of patterns (e.g. vertical, horizontal, etc.) but generally their threshold values grow from a minimum value to a maximum value. Our process is to modulate the halftone cell according to a function: f(s, h) where s is the spatial position of the sub-area of the image and h is the halftone cell. We modulate the cell by altering the relative positions of the threshold values in the cell as we move the cell over the image. This effectively breaks up the bands of clusters of one size or another and provides a visually uniform image even in lighter tones.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings, wherein like reference symbols refer to like parts.

FIG. 7 shows conceptually the dither matrix (halftone cell) tiled over the source image;

FIG. 8 shows conceptually the modulated dither matrix (halftone cell) tiled over the source image;

FIG. 10 illustrates a simplified halftone cell, the halftone cell tiled without modulation, and the halftone cell tiled with modulation;

DESCRIPTION OF THE PREFERRED EMBODIMENTS

Figure 1C:
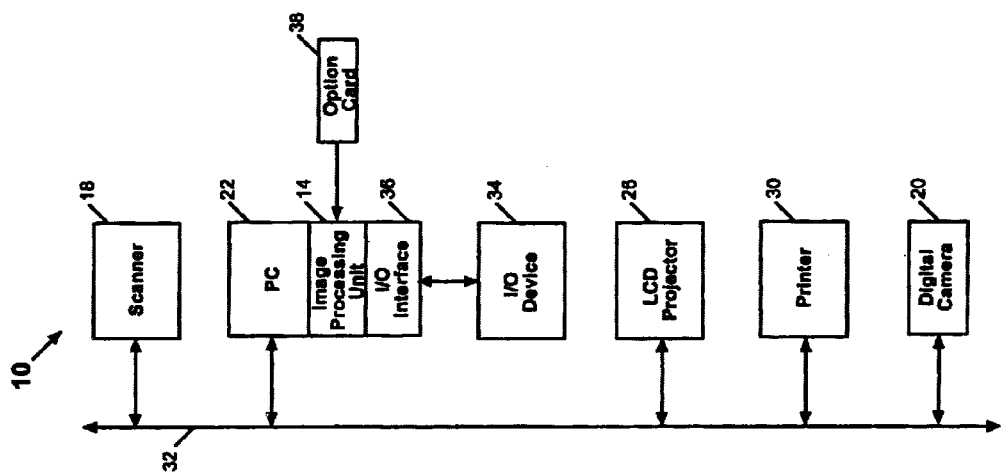
FIGS. 1A, 1B and 1C are block diagram representations of various general configurations of the environment of the present invention.
Figure 1B:
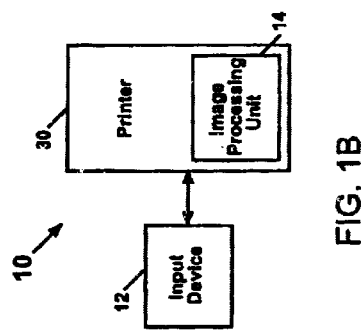
Figure 1A:
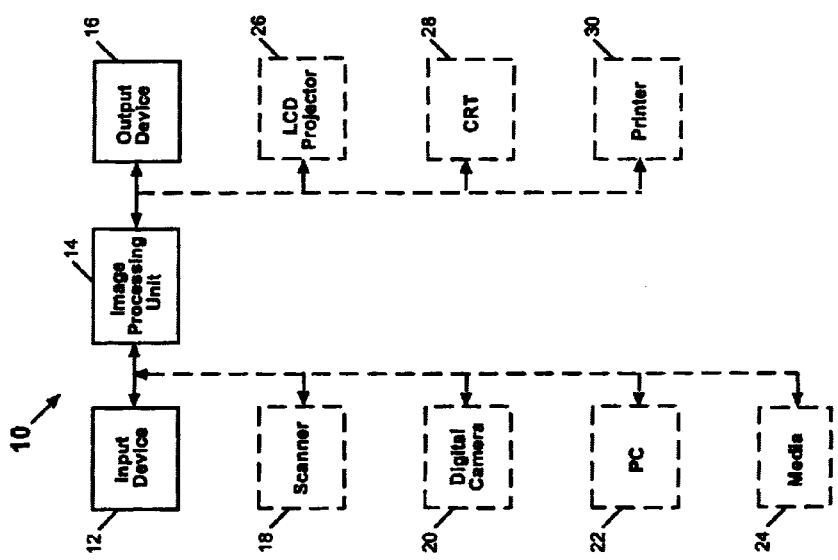

Reference is now made to FIGS. 1A, 1B and 1C which show the general configuration of an image handling unit 10. As shown in FIG. 1A, imaging handling unit 10 has three major components, an input device 12 for providing a source image S, an image processing unit 14 for processing the source image and an output device 16 for displaying or printing the processed image. The input device 12 can take various forms such as a scanner 18, digital camera 20, personal computer (PC) 22 or media 24 (e.g. hard disk or diskette, floppy disc, optical disc). The output device 16 can also take various forms such as an LCD projector 26, CRT 28 or printer 30.

The image processing unit 14 may be implemented in hardware with discrete components, software, firmware, application specific integrated circuits (ASICs), or any combination thereof. Also, the functional blocks of the image processing unit are divided in this specification for convenience of description only. The functional and physical boundaries of these blocks will vary from device to device. For example as shown in FIG. 1A, the image processing unit may be contained in a separate unit that interfaces the input and output devices. As another example, FIG. 1B shows the image processing unit physically integrated with the printer 30. Portions of the image processing may be associated functionally more with the input device than with the output device or vice versa. FIG. 1C shows an embodiment of an image handling unit 10 with the image processing unit formed as part of a personal computer (PC) 22 which may control operation of and communication between the image processing unit, LCD projector, scanner, printer, and control of and communication with peripheral equipment such as I/O device 34, each connected directly or indirectly to a PC Bus 32. In this embodiment, the source image may be have been previously stored (and perhaps enhanced through processing) in an I/O device 34 and can be loaded into the PC through I/O interface 36, or the image may be captured with a digital image input device such as a digital camera 20. In addition, the image processing unit 14, in the form of software, may be loaded into the PC's memory from an external storage device, i.e. I/O device 34. Alternately, the image processing unit in the form of hardware, ASIC, firmware, etc. or combination thereof can be embodied on an option card 38 that can be inserted into an available PC card slot.

Figure 2:
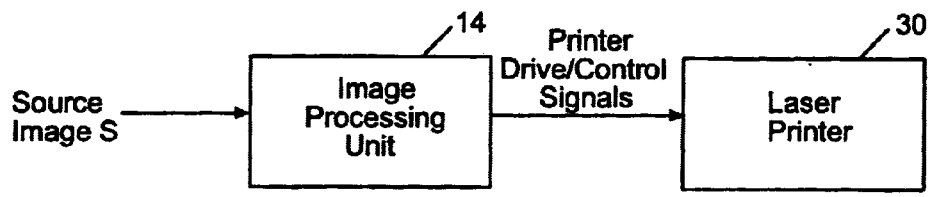
FIG. 2 is a schematic block diagram of the major functional components of the present invention.

While the present invention is applicable to any such device having these basic components, for the sake of illustration only the invention will be described in the environment of a particular image handling unit having an image processing unit 14 for receiving a source image S and providing printer control signals to laser printer 30 to render the image, as shown in FIG. 2. The source image may be from a variety of input devices including a personal computer with image generating capability, a scanner, a digital camera, etc.

Figure 3:
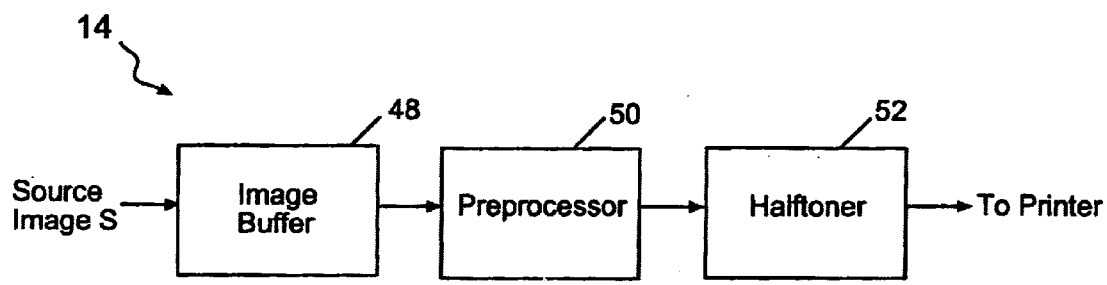
FIG. 3 is a schematic block diagram of the image processing unit of the present invention.

With reference to FIG. 3, which shows the imaging processing unit 14 in more detail, the image may be a digital representation of a printed page or photograph, for example, in the form of a bitmap or combination of bitmaps and is stored in image buffer 48, which may be any suitable memory or an assigned area of a memory, e.g. a random access memory (RAM). This stored electronic image comprises a number of discrete samples called pixels (pixel is a contraction of picture element) or pels (pel is a contraction of print element). Each pixel is defined by its position and intensity. Typically, the precision used for computer storage of images is eight bits per pixel, which permits representation of 256 gray levels.

Color images can be represented by three individual components such as red, green, blue (RGB), used with additive color devices such as a CRT in which active light-emitting sources of different colors are added together to produce the perceived color; or cyan, magenta, yellow (CMY), and sometimes black (designated K), used with subtractive color devices, such as printers, in which inks of different colors are printed on a white reflective paper and selectively absorb certain ranges of wavelengths of light. In a color image, each pixel is often represented by three 8-bit words, i.e. one byte per color component.

The source image which may have been originally represented by pixels in an device (e.g. scanner) dependent color space such as an RGB color space will typically have been transformed into a representation in a device independent color space, such as CIEXYZ or CIELAB. This representation must be further transformed into a printer device dependent color space such a CMYK. Other preprocessing must be performed such as color correction, sharpening, etc. This preprocessing, shown generally as preprocessor 50, will be device specific and such preprocessing methods and apparatus are known in the art of color image processing.

Figure 4:
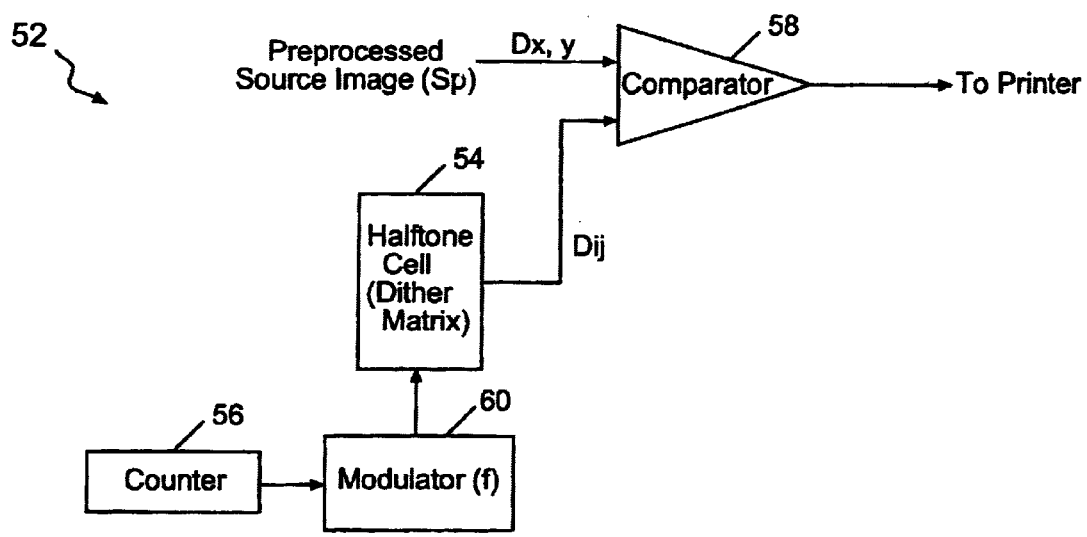
FIG. 4 is a schematic block diagram of the halftoner of the present invention.

The preprocessed source image will be input to halftoner 52, which is shown in greater detail in FIG. 4. It should be understood that the various functional units, e.g. preprocessor 50 and halftoner 52, shown in the figures may be comprised of software, hardware, firmware, ASIC, or combinations thereof. The halftone cell 54 is a matrix or array of threshold values. This array of threshold values may be stored in a memory (e.g. RAM) or may be generated by software under program control at the appropriate time in the halftoning process.

Halftoning involves comparing pixel values with respective threshold values of a halftone cell (threshold matrix). For example, let us assume that the matrix size is 16×16 and the image space is 640 pixels by 480 lines. A halftoning process involves conceptually laying the threshold matrix over each such sub-region of the original image so that each pixel is associated with a respective threshold. Comparing a given pixel's image value with its corresponding threshold value determines whether the pixel will be on or off. If the image value at a given pixel exceeds that pixel's threshold, then the pixel will be on. Otherwise it will be off. The halftoning operation output for each pixel is a binary indication of whether that pixel will be on or off. The elements of the threshold matrix are mapped into the x-y image coordinate space by modulo counter 56, which may comprise a pixel counter and line counter, such that D(x,y)=D (i,j) for i=x mod L and j=y mod L, for an L×L dither matrix.

The current pixel $D_{x,y}$ value (i.e. 0–255) is compared with the corresponding dither matrix $D_{ij}$ value by comparator 58, which will generate one of two values, 1 or 0 for each pixel location. For the purpose of explanation only, one pixel value $P_{x,y}$ is shown but the image will actually be separated into different channels for each of C, M, Y and K. The modulator 60 shown in FIG. 4 will be discussed hereinafter but first we will briefly discuss clustered-dot dithering.

Figures 5, 6:
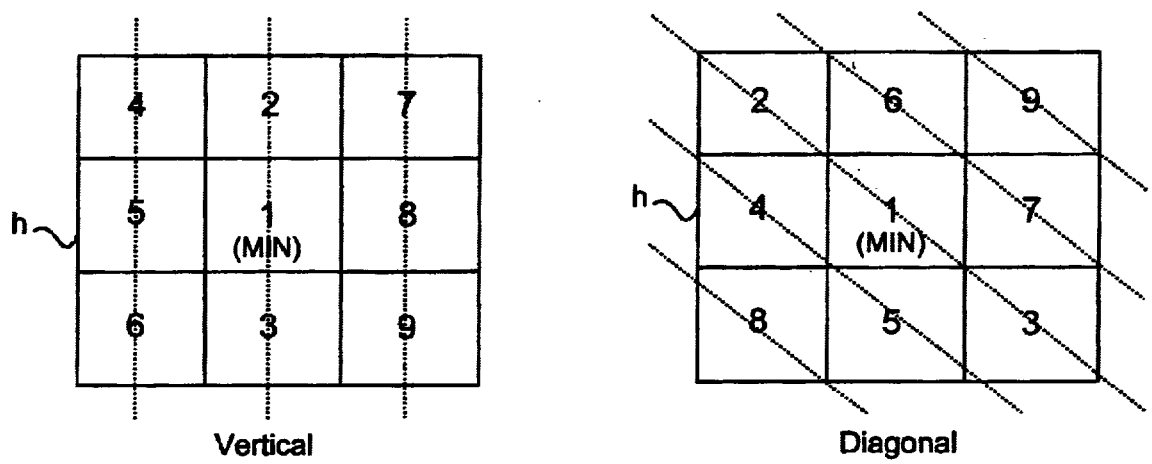
FIG. 5 is an example of the threshold values in a clustered-dot dither matrix (halftone cell)
FIG. 6 shows generally two possible forms of a dither matrix.

FIG. 5 depicts a dither matrix of the type that one can employ for clustered-dot dithering. Each matrix element is associated with a respective image pixel in accordance with the matrix element's position. As an example, let us assume that the pixel values' gray-scale range is 0–255 and that the gray scale requested for the region to which the FIG. 5 matrix is applied is 128, i.e., in the middle of the range. Under these circumstances, the pixel associated with the upper-left matrix element, i.e., with the threshold value of 207, would not receive a dot, since the requested value, 128, is not greater than the threshold value. Nor would the pixel immediately to the right, to which the matrix applies a value of 215, since that threshold, too, is greater than the requested value.

On the other hand, the pixel associated with the upper-right matrix element, whose value is 113, would receive a dot, as would the pixel immediately to its left, with which the matrix associates a value of 65. These are examples of the fact that the illustrated matrix tends to cause printed and non-printed pixels to be clustered. Indeed, if we divide the matrix into quadrants by lines 62 and 64, inspection reveals that, for a gray-scale value of 128, all pixels associated with matrix elements in the upper right and lower left quadrants receive dots, while none of those associated with matrix elements in the upper left and lower right quadrants do.

As discussed above, a matrix such as this is replicated to "tile" the entire image, so the clusters of printed dots will be repeated throughout the region in which the gray-scale value of 128 is requested.

Further inspection of the matrix reveals that the lowest values in the upper right and lower left quadrants are near the respective centers of those quadrants, and values increase more or less in an outward spiral, while the highest values of the upper left and lower right quadrants are in the centers, and values decrease in an outward spiral. As a result, the cluster of printed pixels increases in size as requested gray-scale value increases, while the unprinted-pixel cluster shrinks. The individual clusters typically are small enough in size that the observer ordinarily does not perceive them individually, but as a group the larger clusters produce the effect of a darker gray, while a smaller printed-pixel clusters give the effect of a lighter gray.

FIG. 6 shows the form of a generalized halftone cell h. For simplicity, the threshold values are designated as relative values, rather than actual values that might be used. That is, the minimum value is designated as 1 and the maximum value is designated as 9, with all other threshold values falling between. As shown in FIG. 6, the halftone cell h can be formed in various patterns (i.e. vertical, diagonal, etc.) and will grow from a minimal value (MIN) shown as 1 in the examples to a maximum value shown as 9 in the examples. Regardless of the type of halftone cell h, the pattern, when tiled over the image $S_p$ (as shown in FIG. 7) may show up as banding patterns in the lighter tone regions of the image.

Figure 9:
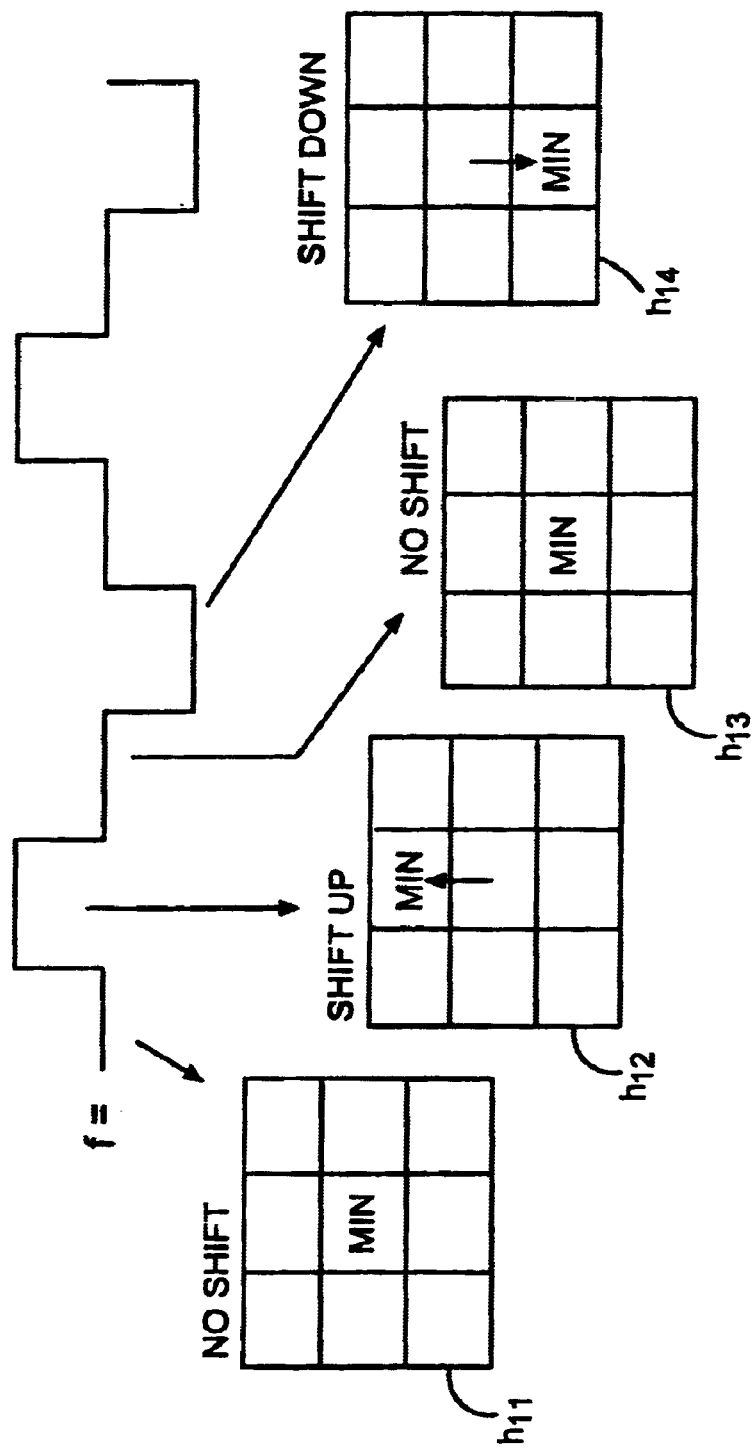
FIG. 9 illustrates an example function for modulating the halftone cell.
Figure 10:
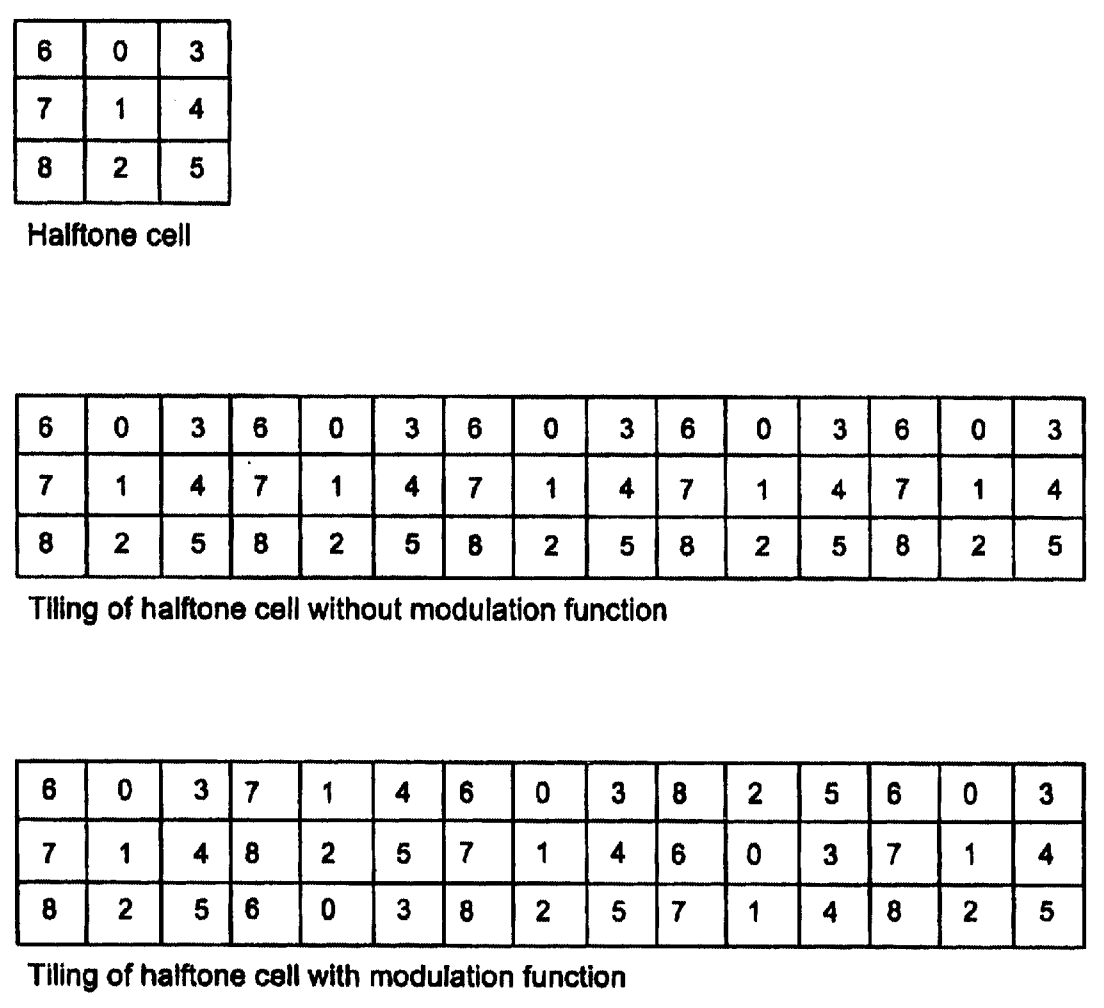

The present invention overcomes these problems as shown in FIGS. 8 and 9 by modulating the halftone cell h as a function of the spatial position of the sub-area on the source image: f (s, h). An example function f is shown in FIG. 9. It causes the cell minimum value (or starting value) to shift as the halftone cell is spatially moved over the image (as represented in FIG. 8). The modulator 60, as shown in FIG. 4, determines the spatial position of the current pixel in the source image by detecting the count values of counter 56 (i.e. pixel count/row count). As the count progresses, i.e. as the halftone cell is, in effect, tiled over the image $S_p$, modulator 60 changes the relative positions of the threshold values in the halftone cell h. Modulator 60, which can be implemented in hardware, firmware or software, can impose any desired function f on halftone cell h. The alternating step function f shown in FIG. 9 is just one example. Functions that shift the threshold values right or left or up/down one diagonal position are other examples. FIG. 10 shows the effect of modulation by the FIG. 9 function f on a simplified halftone cell. Other modulation effects would be produced by other functions.

Figure 11:
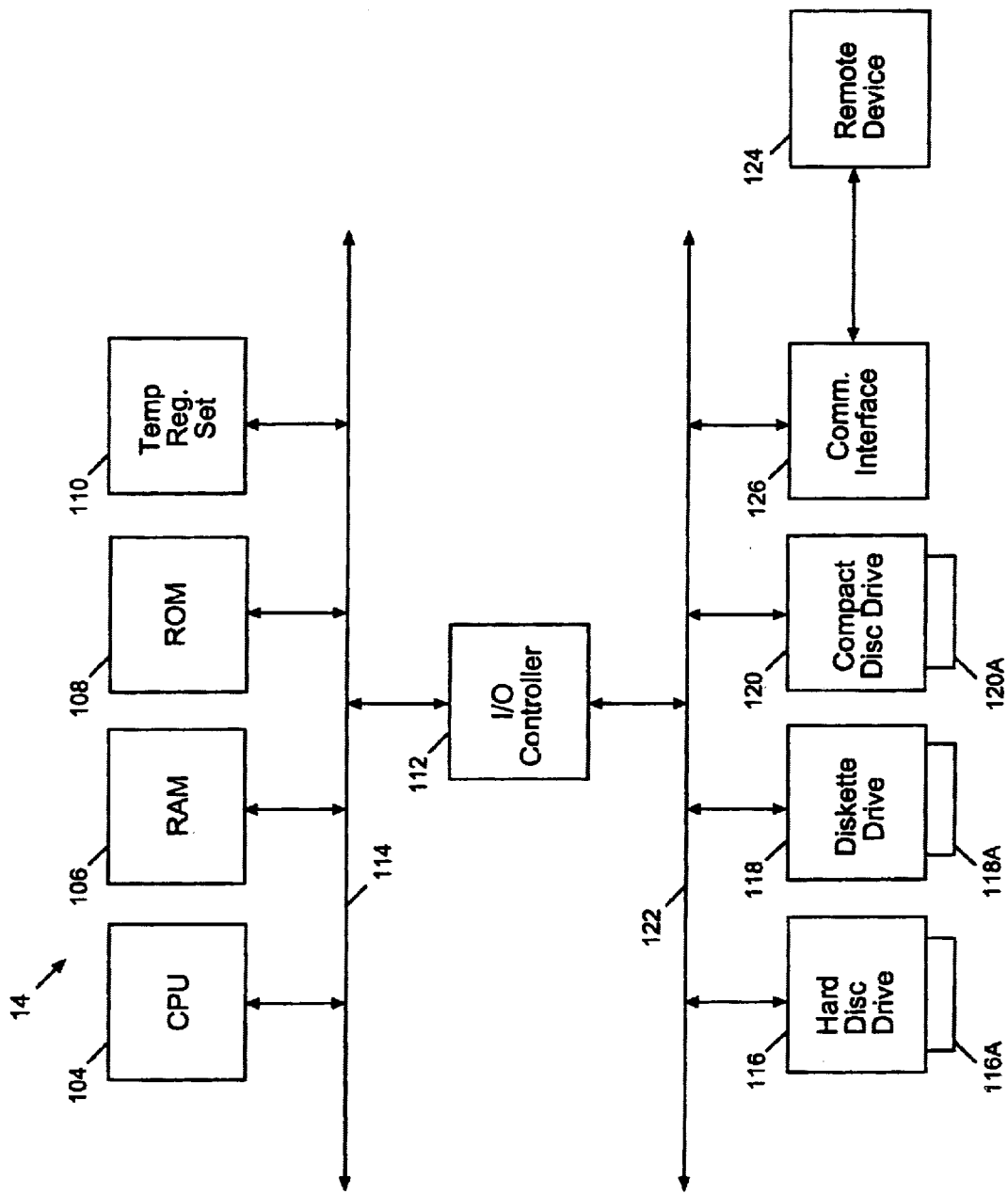
FIG. 11 is a schematic block diagram of an embodiment of the image processing unit of the present invention.

While in the foregoing example the image processing unit 14 is described in terms of various functional units such as image buffer 48, preprocessor 50, halftoner 52, etc., image processing unit 14 may also comprise parts of other system components such as personal computer 22. As shown in FIG. 11, it may further include, for example, a central processing unit (CPU) 104, memories including a random-access-memory (RAM) 106, read-only memory (ROM) 108 and temporary register set 110, and an input/output controller 112, all connected to an internal bus 114. Although for the sake of illustration each of the above units are shown separately, these functional units may form part or all of the various functional units previously described such as image buffer 48, counter 56, halftone cell 54, modulator 60, etc. Further, depending on the nature of the system, e.g. a scanner and printer as part of a centrally controlled network, the functional units may be part of a general purpose computer programmed to control the scanning and printing devices. Additionally, it will be appreciated that these functional units may be implemented with discrete components, application specific integrated circuits, processors executing appropriate software and the like or any combination thereof.

Operating system software and/or application specific software for operating the output device 16 (e.g. printer 30) and/or the image processing unit 14 and/or the various functional units described herein may be stored in any combination of the memories 106, 108 and 110 or may be stored externally in one or more of the I/O units including hard disc drive unit 116, diskette drive unit 118, and compact disc drive 120, each connected to I/O Bus 122. Software for operating the various functional units and/or for implementing the method of the present invention may be stored on a medium such as hard disc 116A, diskette 118A or compact disc 120A, or may be stored at a remote device 124 and input through communications interface 126.

Figure 12:
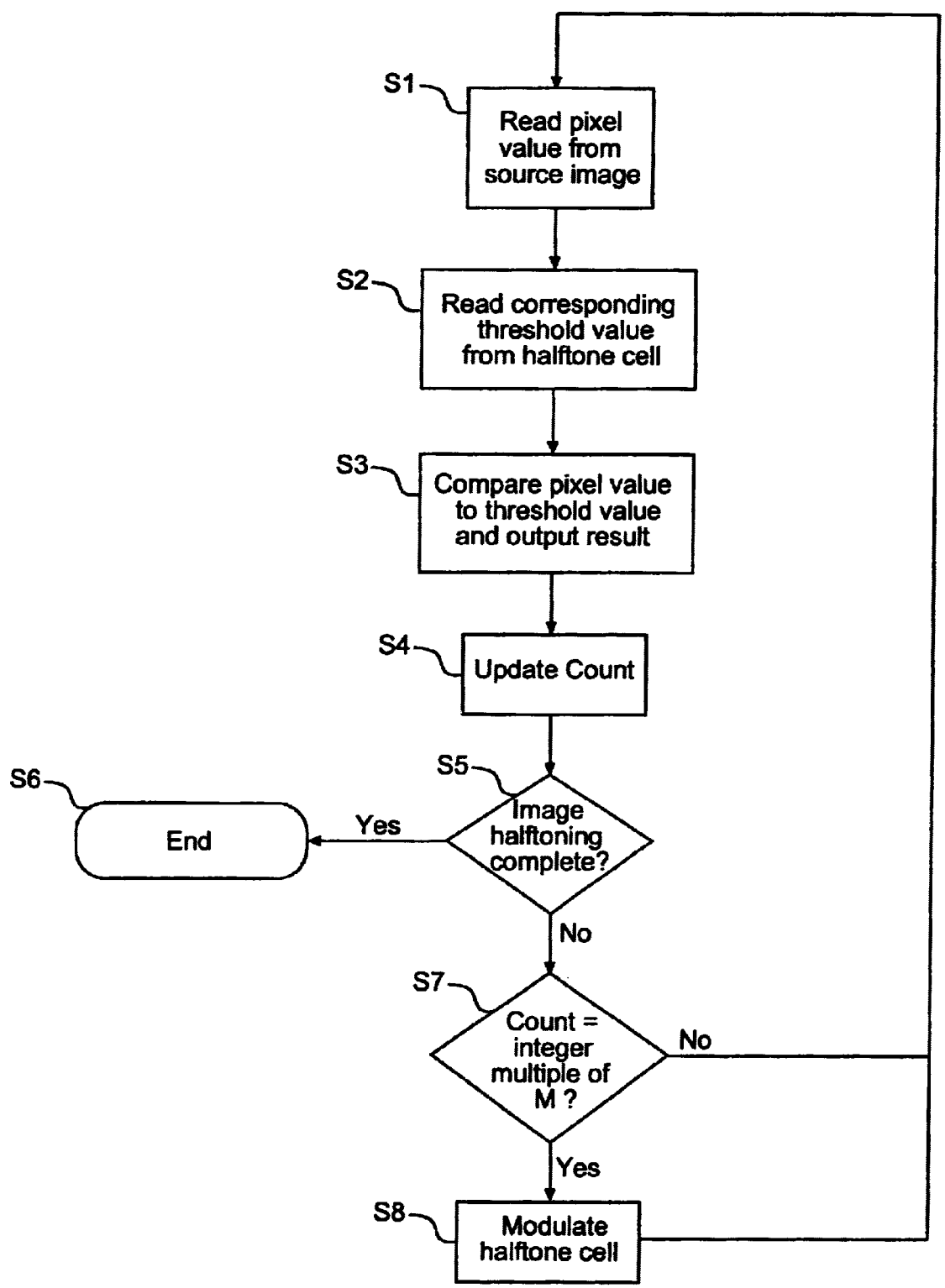
FIG. 12 is flowchart showing the general steps of the method of the present invention.

FIG. 12 shows the general flow of the method of the present invention. Assume that the halftone cell (threshold matrix) has M locations with threshold values in each and the source image has N pixel locations each having a pixel tonal value, where N is an integer multiple of M, and the M threshold values are compared to respective subsets N1, N2, ... Nn of source pixel values corresponding to sub-areas of the source. At step S1, the counter (i.e. pixel counter/row counter) is set to an initial value and the first pixel value is read from the source image. According to the same counter, threshold values are read from the halftone cell in step S2, but remember that the location D(i,j) of elements in the threshold matrix are mapped to the location D(x,y) of pixels in the source image coordinate space such that D(x,y)=D(i,j) for i=x mod L and j=y mod L, for an L×L dither matrix.

Each pixel value is compared to a respective threshold value at step S3 with the result of the comparison being a binary indication (e.g. 1, 0) to the printer of whether or not the pixel at the respective location in the output image will receive a dot. After each pixel value/threshold value comparison, the count in the counter is updated in step S4. If, at step S5, the counter has reached an end value indicating the entire source image has been halftoned the process ends at step S6. Otherwise, in step S7, the count is checked to see if it is an integer multiple of M, i.e. has the halftone cell been tiled over one sub-area or subset of pixels (i.e. N1 or N2 ... or Nn) and is it now about to be tiled over another sub-area. If not, flow returns to steps S1 to S3 to compare the next pixel value in the current sub-area to the corresponding threshold value in the halftone cell. If the answer in step S7 is yes, then the halftone cell in modulated in step S8 so that a different arrangement of threshold values are used for comparison with the pixel values of the next sub-area of the source image.

While FIG. 12 depicts the method of the present invention with the halftone cell being tiled over the source image, one tile and then another and so on, in practice pixel values from the source image will typically be read and compared to the threshold values on a row-by-row basis. Selection of the halftone cell threshold value, D(i,j), will be made on the basis of the location of the pixel value in the source image coordinate space, D(x,y), according to the modulation function (f). For example, for an L×L dither matrix, the location D(i,j) of elements in the halftone cell (dither matrix) are mapped to the location D(x,y) of pixels in the source image coordinate space according to the modulation function (f) shown in FIGS. 9 and 10, as follows:

$$D(x,y)=D(i,j) \text{ for } i=x \bmod L \text{ and } j=y \bmod L,$$

when y=m, 2L+m, 4L+m ... $2^K$L+m, where m and K are integers, and $$D(x,y)=D(i,j) \text{ for } i=(x+1) \bmod L \text{ and } j=y \bmod L,$$

when y=L+m, 5L+m, 9L+m ... (4K+1)L+m, and $$D(x,y)=D(i,j) \text{ for } i=(x+2) \bmod L \text{ and } j=y \bmod L,$$

when y=3L+m, 7L+m, 11L+m ... (4K+3)L+m.

Figure 13:
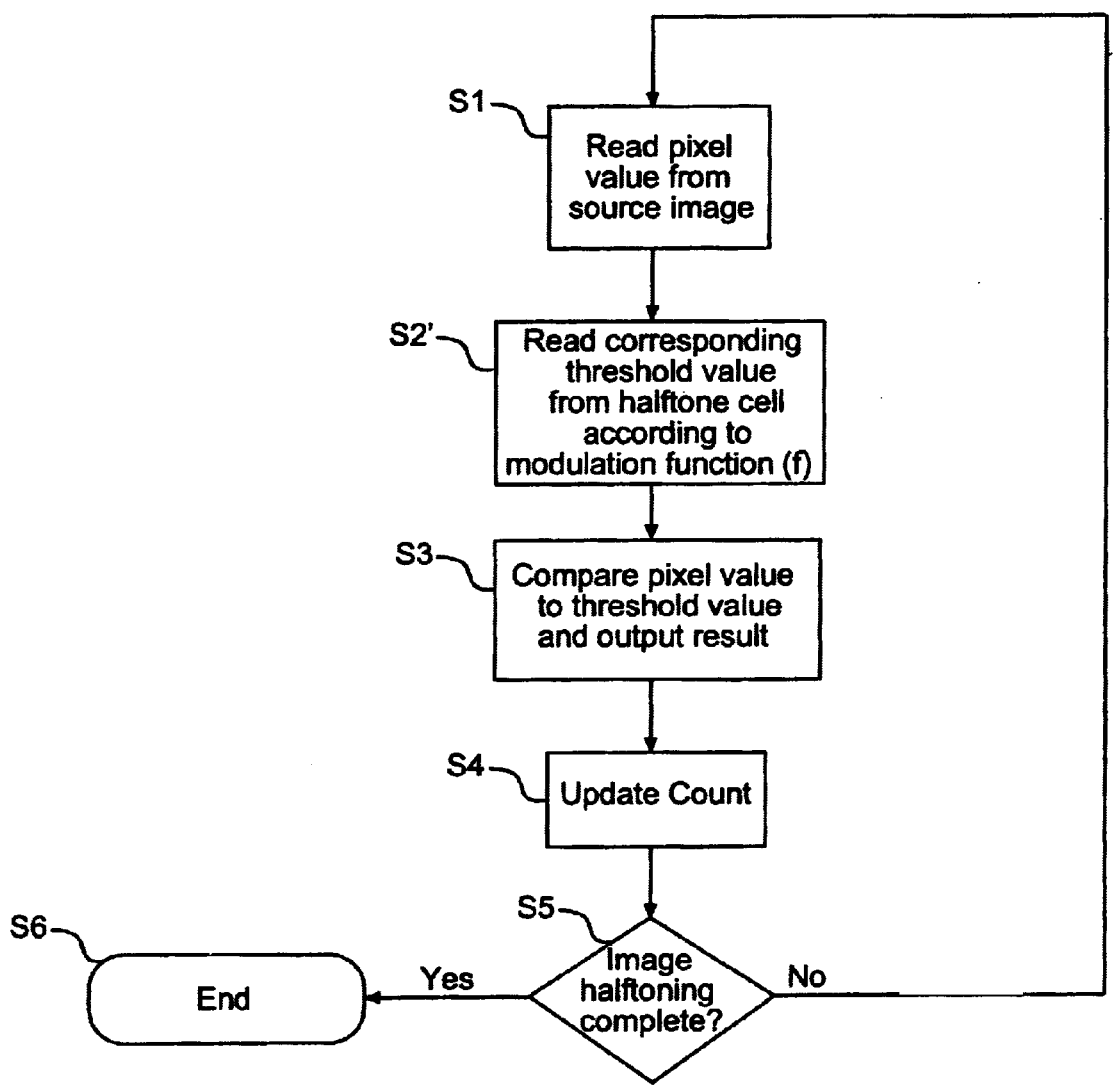
FIG. 13 is flowchart showing the general steps of the method of the present invention in a preferred embodiment.

This method is depicted in FIG. 13. In step S2', the threshold value is read from the location (Di,j) in halftone cell by modulator 60 in accordance with the modulation function and the location of the pixel D(x,y) currently being read from the source image, as indicated by counter 56, e.g. as described above.

The modulation function (f), shown as modulator 60 in FIG. 4, and halftone cell 54 can comprise software, firmware, ASIC, discrete hardware components or combinations thereof. Selection of a particular halftone cell, threshold values and modulation function will depend on the characteristics of the particular type of printer to which our invention is applied. However, our invention will reduce the banding effect to some degree regardless of the function used and regardless of the halftone cell as long as the halftone cell is modulated as it is effectively tiled over the source image as a function of spatial position of the sub-area being halftoned.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. An image processing apparatus comprising:
   a source image memory that stores a source image comprising a plurality N of source image pixel values;
   a halftone cell memory that stores a threshold array comprising a plurality M of threshold values, M being less than N;
   a modulator that selects threshold values from said threshold array according to a modulation function f (s, h), where s is a spatial position of a pixel in said source image and h is said array of threshold values;
   a comparator that compares said M threshold values to at least a first subset N1 and a second subset N2 of said source image pixel values to produce at least first and second portions of an output image having a lower tonal resolution than said source image, N1 equaling N2 equaling M; and
   a counter that counts the spatial position of each pixel in said source image, said source image memory being responsive to said counter for providing to said comparator a source image pixel value and said modulator being responsive to said counter reaching a value equal to a multiple of M for shifting a location of a minimum value in said threshold array and for selecting a threshold value from a respective location in said threshold array for provision to said comparator.

2. An image processing apparatus according to claim 1 wherein said modulation function f is an alternating step function.

3. A method operating an image processing system, comprising:
   reading a pixel value from a source image comprising a plurality N of source image pixel values;
   counting a spatial position of each pixel in said source image, said source image memory being responsive to said counting for providing to a comparator a source image pixel value;
   reading a threshold value from a halftone cell according to a modulation function, said halftone cell comprising a plurality M of threshold values, M being less than N, and said modulation function comprising: f (s, h), where s is a spatial position of a pixel in said source image and h is said cell of threshold values, said modulation function being responsive to said counting step reaching a count value equal to a multiple of M for shifting a location of a minimum value in said cell of threshold values and for selecting a threshold value from a respective location in said cell of threshold values for provision to said comparator;
   comparing with said comparator said M threshold values to at least a first subset N1 and a second subset N2 of said source image pixel values to produce at least first and second portions of an output image having a lower tonal resolution than said source image, N1 equaling N2 equaling M.

4. A method of operating an image processing system according to claim 3, wherein said pixel value reading step and said threshold value reading step include counting the spatial position of each pixel as its value is read from said source image.

5. A method of operating an image processing system according to claim 3 wherein said modulation function f is an alternating step function.

6. A medium readable by a machine embodying a program of instructions executable by said machine to perform a method of operating an image processing system, said method comprising:
   reading a pixel value from a source image comprising a plurality N of source image pixel values;
   counting a spatial position of each pixel in said source image, said source image memory being responsive to said counting for providing to a comparator a source image pixel value;
   reading a threshold value from a halftone cell according to a modulation function, said halftone cell comprising a plurality M of threshold values, M being less than N, and said modulation function comprising: f (s, h), where s is a spatial position of a pixel in said source image and h is said cell of threshold values, said modulation function being responsive to said counting step reaching a count value equal to a multiple of M for shifting a location of a minimum value in said cell of threshold values and for selecting a threshold value from a respective location in said cell of threshold values for provision to said comparator;
   comparing with said comparator said M threshold values to at least a first subset N1 and a second subset N2 of said source image pixel values to produce at least first and second portions of an output image having a lower tonal resolution than said source image, N1 equaling N2 equaling M.

7. A medium according to claim 6, wherein in said method said pixel value reading step and said threshold value reading step include counting the spatial position of each pixel as its value is read from said source image.

8. A medium as in claim 6 wherein in said method said modulation function f is an alternating step function.

9. An image processing system comprising:
   an input device that provides a source image;
   a source image memory that stores said source image comprising a plurality N of source image pixel values;
   a halftone cell memory that stores a threshold array comprising a plurality M of threshold values, M being less that N;
   a modulator that selects threshold values from said threshold array according to a modulation function f (s, h), where s is a spatial position of a pixel in said source image and h is said array of threshold values;
   a comparator that compares said M threshold values to at least a first subset N1 and a second subset N2 of said source image pixel values to produce at least first and second portions of an output image having a lower tonal resolution than said source image, N1 equaling N2 equaling M; and
   a counter that counts the spatial position of each pixel in said source image, said source image memory being responsive to said counter for providing to said comparator a source image pixel value and said modulator being responsive to said counter reaching a count value equal to a multiple of M for shifting a location of a minimum value in said threshold array and for selecting a threshold value from a respective location in said threshold array for provision to said comparator according to said modulation function; and
   an output device responsive to said comparator to produce said output image.

10. An image processing system as in claim 9 wherein said input device is a scanner.

11. An image processing system as in claim 9 wherein said input device is a personal computer.

12. An image processing system as in claim 9 wherein said input device is a digital camera.

13. An image processing system as in claim 9 wherein said input device is a medium.

14. An image processing system as in claim 9 wherein said output device is a printer.

15. An image processing system as in claim 9 wherein said output device is a laser printer.

* * * * *